M. M. NORTHRUP.
PEANUT-ROASTER.
No. 174,147. Patented Feb. 29, 1876.
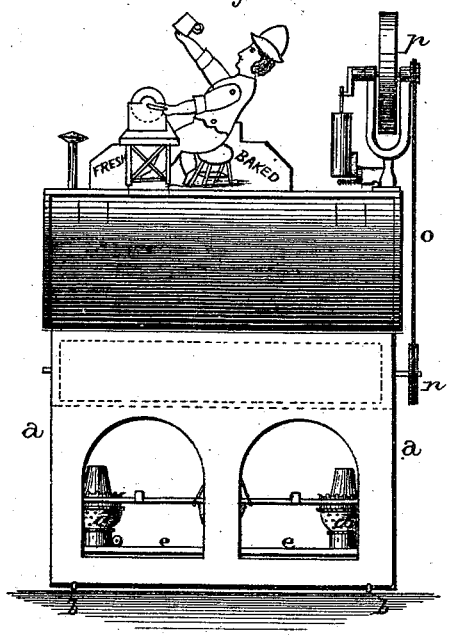
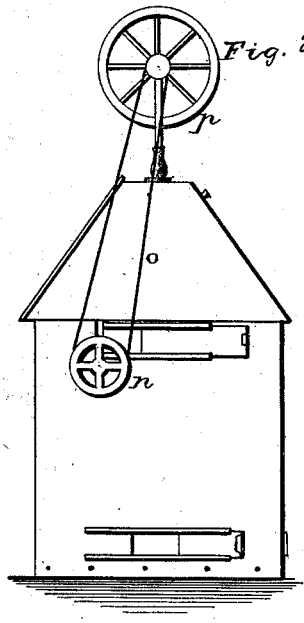
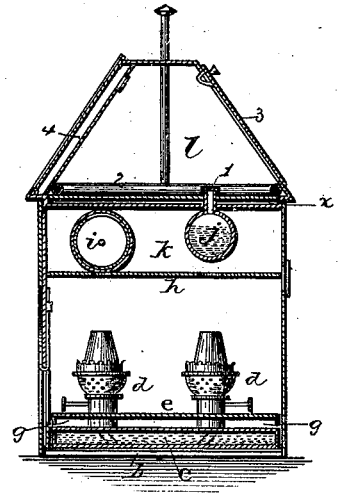
WITNESSES.
J. Wm. Garner
Jno. Irwin Jr.
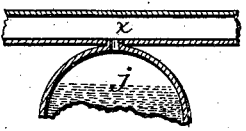
INVENTOR.
M. M. Northrup
per
F. A. Lehmann, Atty.
N. PETERS, PHOTO-LITHOGRAPHER, WASHINGTON, D. C.

UNITED STATES PATENT OFFICE.

MILTON M. NORTHRUP, OF UTICA, NEW YORK.

IMPROVEMENT IN PEANUT-ROASTERS.

Specification forming part of Letters Patent No. 174,147, dated February 29, 1876; application filed August 10, 1875.

*To all whom it may concern:*

Be it known that I, MILTON M. NORTHRUP, of Utica, in the county of Oneida and State of New York, have invented certain new and useful Improvements in Apparatus for Roasting, Warming, and Preserving Peanuts; and I do hereby declare the following to be a full, clear, and exact description of the invention, such as will enable others skilled in the art to which it pertains to make and use it, reference being had to the accompanying drawings, which form part of this specification.

My invention relates to an apparatus for baking, warming, and preserving peanuts; and it consists in the arrangement and combination of parts that will be more fully described hereafter, whereby the nuts can be baked or roasted without the aid of manual labor, and can be kept continuously and moderately warm until sold, thus dissipating and preventing the absorption of moisture, and keeping them as fresh and crisp as when first roasted.

Figure 1 is a front view of my invention. Fig. 2 is a side view of the same. Fig. 3 is a section through the center of the apparatus, and Fig. 4 is a detail view.

*a* represents a sheet-iron frame or box, having the shape and appearance of a house, or any other shape that fancy may dictate. Across the bottom of the box are placed a number of rods or wires, *b*, upon which the oil-tank *c* is placed. The tank is provided with any desired number of lamp-burners, *d*, and upon the top of the tank is placed the sheet *e*, of zinc, or other non-conducting material, so as to protect the reservoir from the heat of the burners. This sheet is raised sufficiently far above the top of the reservoir to form a cold-air chamber, *g*, and both at the sides and ends of the box *a* there are made suitable openings, covered with slides, for the admission of cold air to this chamber. In the front of the box there is made one or more openings, which are covered with slides of glass, so as to lighten up the interior of the box and allow the burners to be seen, which burners should be provided with chimneys. Above the top of the burners, at a suitable distance, is placed a perforated plate, *h*, through which the heat of the burners passes to, and which plate forms a hot-air chamber, *k*, and a wind-protector to preserve a steady blaze, and to prevent the burners from smoking when used in open air. Above the chimneys is a steam or hot water tank, *x*, which, being kept hot by steam from the boiler *j*, heats the chamber *l* above it, so as to keep the peanuts continuously and moderately warm until sold. Through one or more sides of the box *a*, on a level with this chamber *k*, are made one or more openings, provided with slides, so as to regulate the heat. The cylinder *i*, having journals at each end and a removable cover, has its bearing in the side of the box, immediately above one of the rows of burners, and is made to constantly revolve by means of the pulley *n* on the end, the belt or cord *o*, and small engine *p* on the top of the box. In order to form the bearings in the box, vertical slits are cut in the ends, and then slides are pushed across the tops of the journals, so as to close the slits and hold the cylinder steady. Secured to the under side of the heating-chamber *l*, in which the nuts are placed to be kept warm after having been roasted, is the boiler *j*, which is filled through the orifice 1. Connected with this boiler is the steam-pipe 2, which extends all the way around the bottom of the chamber *l*, so as to heat the nuts placed therein and then connects with the engine *p*. Through one side of the slanting roof, or top of the box, is made a door, 3, to the chamber *l*, while upon the other side of the top there is formed a hollow chamber, 4, covered with glass, in which the nuts are exposed to view, without the usual loss of pickings by boys and non-customers. Upon the top of the house is placed any moving attractive toy or object, that may be operated either by the engine or in any other way that may be desired, which toy or object is designed to catch the attention and direct it to the apparatus.

Having thus described my invention, I claim—

1. In combination with the chamber *l*, in which the nuts are placed to be kept warm, the steam or hot water chamber *x*, substantially as set forth.

2. In a peanut-roaster, the perforated partition *h* for forming a guard to prevent the chimneys from smoking, in combination with the hot-air chamber $k$, to retain the heat around the boiler and under the steam-chamber $x$, substantially as shown.

3. In a peanut-roaster, the combination of the reservoir $c$, provided with suitable burners, a revolving cylinder, $i$, operated by an engine, $p$, a heating-chamber, $l$, and a boiler, $j$, substantially as described.

In testimony that I claim the foregoing I have hereunto set my hand this 3d day of August, 1875.

MILTON M. NORTHRUP.

Witnesses:
BENJAMIN M. LANNING,
HENRY A. LANNING.